Nov. 14, 1961    M. A. PARADISO ET AL    3,008,810
VAPOR OUTLET

Filed Nov. 24, 1958    3 Sheets-Sheet 1

INVENTORS
Michael A. Paradiso
BY John F. Vignone
Francis F. Johnston
AGENT

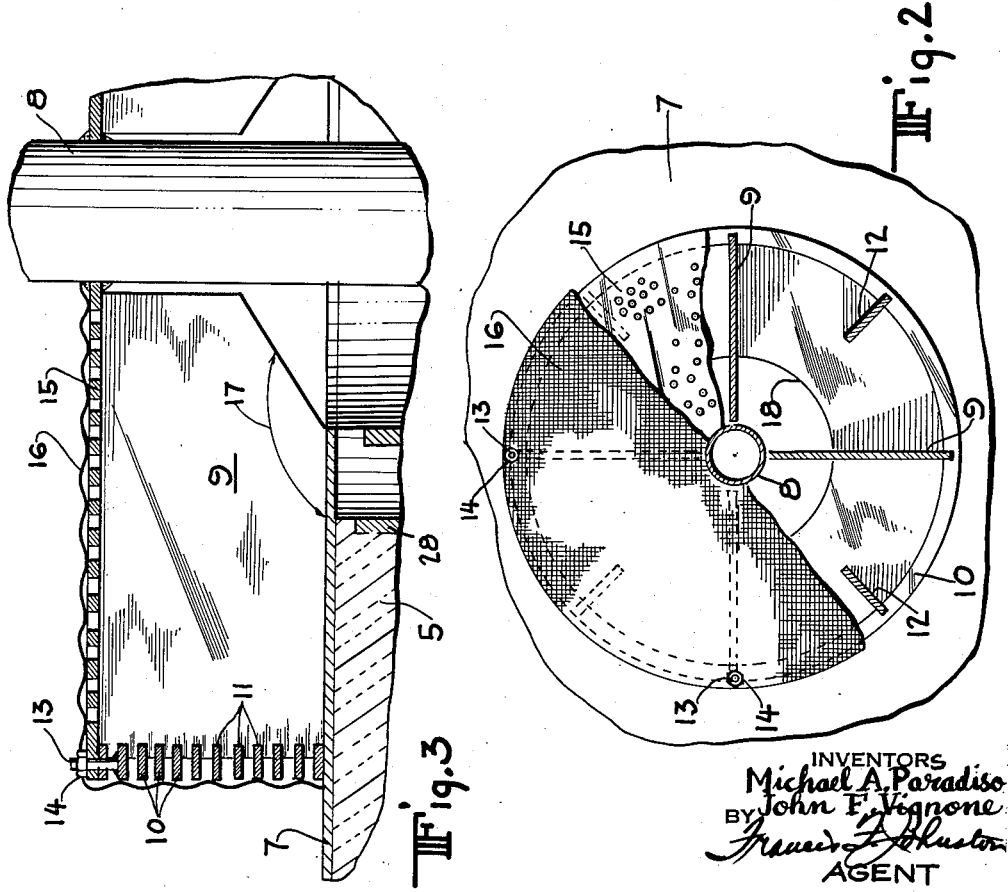

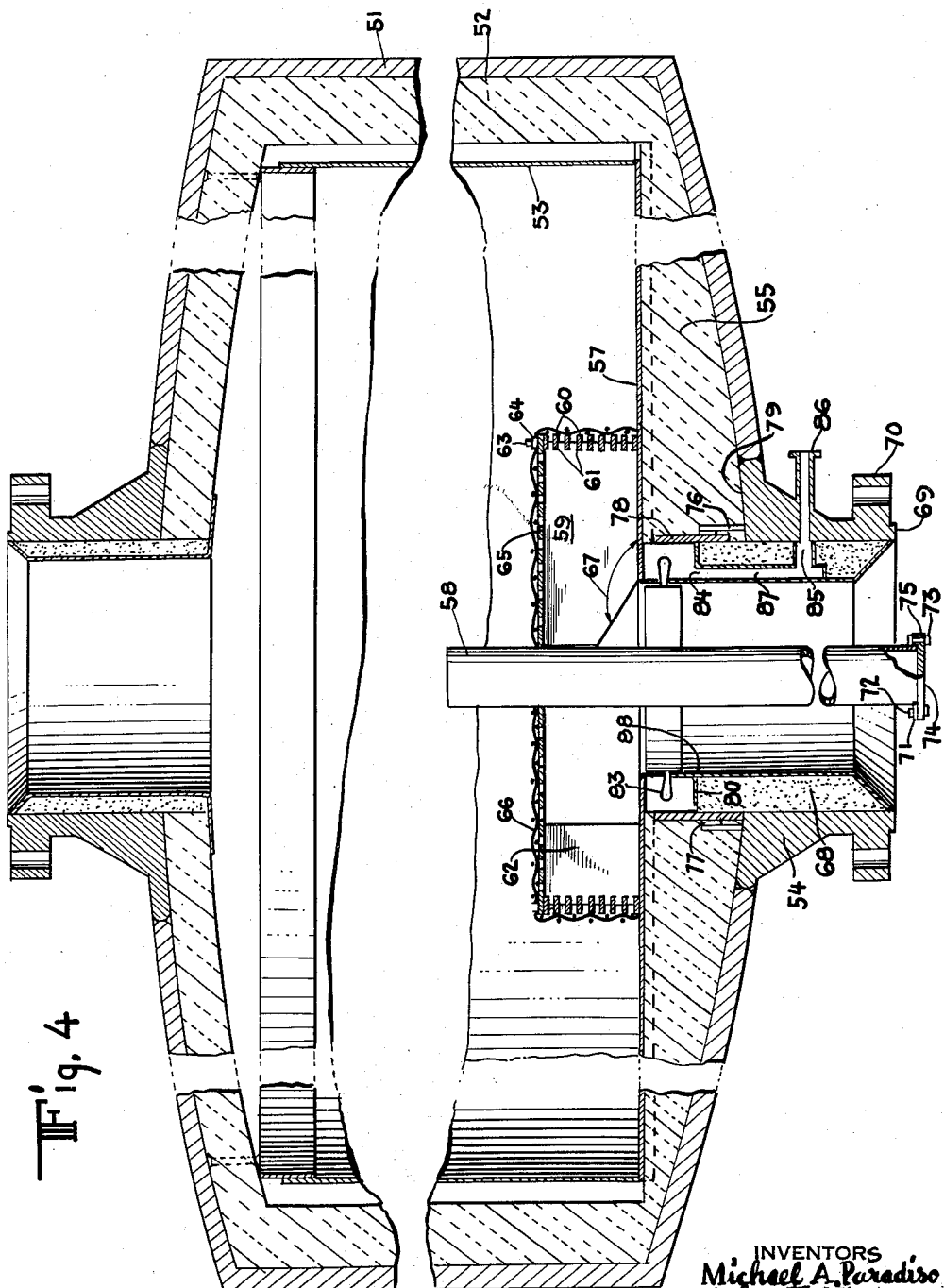

United States Patent Office 3,008,810
Patented Nov. 14, 1961

3,008,810
VAPOR OUTLET
Michael A. Paradiso, Brooklyn, and John F. Vignone, Rego Park, N.Y., assignors to Socony Mobil Oil Company, Inc., a corporation of New York
Filed Nov. 24, 1958, Ser. No. 775,895
7 Claims. (Cl. 23—288)

The present invention relates to reactors for hydrocarbon conversions employing a static bed of particle-form solid catalyst and, more particularly, to vapor outlets for reactors for hydrocarbon conversions employing a static bed of particle-form solid catalyst and inert material. The inert material fills the bottom of the reactor to a level equal to the height of the dump pipe.

A reactor for hydrocarbon conversions, particularly those employing a static bed of particle-form solid catalyst and especially for those hydrocarbon conversions in which a gaseous reactant and a vaporous reactant are present in the reaction zone must be designed to separate the fluid reactants from particles of the catalyst at the vapor outlet of the reactor. The vapor outlet must be designed to ensure that a minimum, preferably none, of the catalyst is carried into the piping between the vapor outlet of the reactor and the heat exchanger train which usually is downstream of the reactor in order to increase the thermal efficiency of the whole unit. The means whereby the reaction vapors are separated from the catalyst must support a load equal to the weight of catalyst, plus the weight of inert material, plus the pressure drop across the catalyst and inert material.

In addition, the vapor outlet comprising an outer shell, an inner lining and an intermediate layer of insulating material must be installed at ambient temperatures while during operation the inner lining is subjected to temperatures of 600 to 1000° F. or higher. Consequently, the inner lining must be provided with an expansion joint. However, since it is desirable because of space limitations to position the expansion joint in the conduit in the vapor outlet connecting the space between the reactor lining and the insulated shell and the purge connection mounted on the reactor outlet, it is necessary to seal the expansion joint from catalyst fines. For obvious reasons it is desirable and even necessary that the expansion joint sealing means be removable.

Accordingly, the present invention provides a vapor outlet comprising a vapor-solids separator across which the pressure drop is markedly less than that across prior art vapor-solids separators and a removable expansion joint catalyst fine-tight sealing means.

Heretofore, a previously accepted vapor-solids separator comprised a hollow metal cylinder of suitable thickness to ensure against collapse. The hollow metal cylinder was provided with perforations or orifices. The total area of the orifices or ports was limited to about 30 percent of the total area of the surface of the hollow cylinder to ensure structural strength. The hollow metal cylinder was provided on the outer periphery thereof with a plurality of studs extending sufficiently above the upper edge or catalyst bed side of the hollow cylinder to accommodate a perforated cover plate and a nut superposed thereon at each stud for holding the perforated cover plate in place. On the outer periphery of the hollow cylinder and on the upper or catalyst bed side of the perforated cover plate metal screens were mounted. The assembly was then mounted upon a base plate.

Accordingly, it is an object of the present invention to provide a vapor outlet for reactors for hydrocarbon conversions wherein a static bed of particle-form solid catalyst is employed in which the area for passage of gases and vapors is at least 75% and preferably 90 percent of the total vertical peripheral area of the vapor-solids separator. It is another object of the present invention to provide a vapor outlet for reactors for hydrocarbon conversions having an expansion joint in the inner wall of said vapor outlet and having the bellows of said expansion joint external of said inner wall and a substantially catalyst fines-tight sealing ring rigidly but movably mounted covering the open end of said bellows.

Other objects and advantages of the present invention will become apparent from the following description taken in conjunction with the drawings in which FIGURE 1 is a vertical section of a spherical reactor showing the vapor outlet of the present invention;

FIGURE 2 is a plane view of the vapor-solids separator with the cover plate cut away;

FIGURE 3 is a view showing in exaggerated size a stiffener and the manner in which the rings supporting the vertical screen are mounted on the stiffener;

FIGURE 4 is a vertical cross-section of a cylindrical reactor showing the novel vapor-solids separator and one means of mounting the substantially catalyst fines-tight expansion joint seal sleeve;

FIGURE 5 is a section showing in detail the method of mounting the substantially catalyst fines-tight expansion joint seal sleeve;

FIGURE 6 is a plane view of a vapor outlet having the expansion joint seal sleeve shown in FIGURES 4 and 5.

Figure 1:
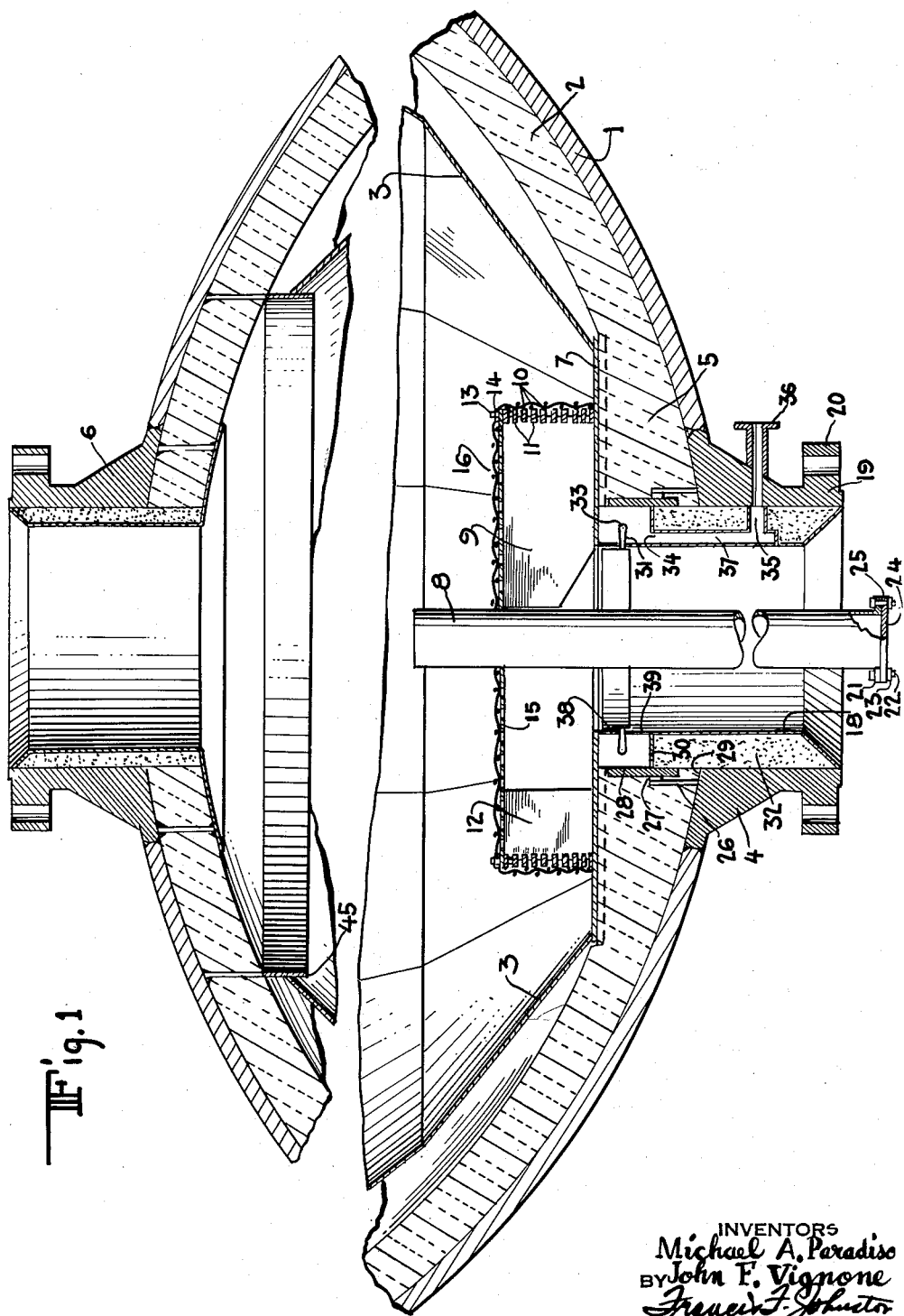

A vertical section of a spherical reactor having the vapor outlet of the present invention is shown in FIGURE 1. The reactor comprises a shell 1, a layer of insulating material 2, and a liner 3. The insulating material forming layer 2 is thickened in the region of the vapor outlet neck 4 to provide a substantially horizontal shelf or platform 5, having canals or open conduits in the upper surface thereof for the admission of purge gas to the space between the bottom supported liner 3 and the insulating material 2. The reactor is also provided with a vapor inlet neck 6. (The spherical reactor and its appurtenances are more fully described in copending application for United States Letters Patent Serial Number 761,780, filed September 18, 1958, in the names of Andrew K. Brumbaugh (deceased) et al.)

Liner 3 is spaced from insulating layer 2 and rigidly mounted on base plate 7 in the region of the outer periphery thereof. Base plate 7 is mounted on shelf or platform 5. The reactor is provided with a liner bearing ring 45 concentric with said vapor inlet 6 against which the upper edge of liner 3 rests.

Base plate 7 is an annulus having an outer diameter smaller (say ½"±) than that of shelf 5 to allow for expansion and an inner diameter substantially that of the conduit formed by lining 18 of vapor outlet neck 4.

Mounted on base plate 7 is a solids-vapor separator. Extending radially from catalyst dump pipe or conduit 8 is a plurality, usually 8, of support plates or stiffening ribs 9. Intermediate each pair of said stiffening ribs or support plates 9 is an auxiliary stiffening rib or support plate 12. A plurality of horizontal bands or notch annuli 10 are rigidly mounted in slots or notches 11 of stiffening ribs or support plates 9 and auxiliary stiffening ribs or support plates 12.

Movably mounted as by means of a plurality of studs 13 and held in place by nuts 14 is an annular perforated cover plate 15. The inner periphery of said annular cover plate 15 being welded to the outer periphery of catalyst dump conduit 8. Preferably the annular perforated cover plate is provided with orifices on one inch centers and the total perforated area does not exceed about 97 percent of the total horizontal area of said annular perforated cover plate.

Wire mesh or screen 16, preferably 3 mesh size, is rigidly mounted as by spot welding on the top of the annular perforated cover plate 15 and on the outer peripheries of annular bands 10.

Stiffening ribs 9, preferably are rectangular having a length substantially equal to the distance between the outer periphery of catalyst dump conduit 8 and the inner periphery of annular bands 10 plus at least about half the width of the annular bands 10. The lower central corner of each stiffening rib is removed so that angle 17 is about 150 degrees and the central end of the edge of the stiffening rib resting on base plate 7 substantially coincides with the inner periphery 18 of the vapor outlet conduit. The stiffening ribs have a height substantially equal to the distance between base plate 7 and the bottom of perforated cover plate 15.

Auxiliary stiffening ribs 12 extends from base plate 7 to the bottom of perforated cover plate 15. The auxiliary stiffening ribs 12 extend inwardly from the annular rings 10 as required. Said auxiliary stiffening ribs likewise are slotted to receive said annular rings. Preferably, said annular rings are rigidly mounted, as by welding, on said auxiliary stiffening ribs as well as stiffening ribs 9.

Catalyst dump conduit or pipe 8 extends from the bottom of the catalyst bed at least to the horizontal plane in which the outer face 19 of flange 20 of reactor neck 4 lies. Catalyst dump pipe or conduit 8 is provided with two lugs or ears 21 through which bolts 22 having nuts 23 pass. Catalyst dump pipe or conduit 8 is provided with closure means comprising a plate 24 having ears 25 through which bolts 22 pass. Closure plate 24 is drawn into a catalyst-tight position by drawing up on nuts 23.

A plurality of studs 26, usually 8 in number, are mounted on the internal face of neck 4 spaced from the inner periphery 29 of neck 4 a distance such that the inner surface of ring 28 is substantially in line with the inner periphery of neck 4. A plate 27 is welded or otherwise rigidly mounted on each of studs 26. A ring 28 is rigidly mounted as by welding on plates 27, the whole comprising a support for the lateral surface of insulating layer 5. This insulation protecting structure can be omitted when desirable. It is to be noted that ring 28 does not extend to base plate 7 and that ring 28 is formed from metallic mesh.

Neck 4 is provided with a purge connection, an insulating layer, an internal conduit, and a single U expansion joint in the aforesaid internal conduit. The internal conduit and expansion joint, together with the layer of insulation, combine to form a purge gas conduit and purge gas chamber in fluid connection with a purge gas distribution conduit through which purge gas is passed to purge the space between the bottom-supported liner and the layer of insulating material on the inner surface of the reactor shell.

A horizontal annulus 30 is mounted rigidly in any suitable manner, as by welding, on the outer periphery of vapor conduit 18 a distance from the base plate 7 sufficient to accommodate expansion joint 31. Annulus 30 has an outside diameter substantially that of the inner diameter of neck 4. The inner diameter of annulus 30 is substantially that of the vapor conduit 18 of neck 4 and the internal diameter of base plate annulus 7. In other words, the width of annulus 30 is that of the insulating layer 32 and somewhat greater than the depth of bellows 33 of expansion joint 31. Annulus 30 is provided with a notch or U-shaped orifice 34.

Insulating material 32, for example, insulating concrete "gunned" in place, is mounted on the inner wall of neck 4 between annulus 30 and the outer edge of neck 4 to a depth substantially equal to the width of annulus 30. A port 35 in fluid connection with purge connection 36 and a purge conduit 37 permitting flow of purge gases from purge connection 36 to notch or U-shaped orifice 34 in annulus 30 is provided in any suitable manner in the layer of insulating material 32.

A vapor conduit 18 is rigidly mounted, as by welding the upper end thereof to ring 39 and the lower end thereof to the outer edge of neck 4, on the layer 32 of insulating material.

Expansion joint 31, which is a single U or bellows ring shaped expansion joint, is welded or otherwise rigidly mounted on ring 38. Ring 38 in turn is welded or otherwise rigidly suspended from base plate annulus 7 in the region of the inner periphery thereof. The lower edge of expansion joint 31 is welded or otherwise rigidly mounted on ring 39. The top of ring 38 being anchored to plate 7, which is fixed due to the load it carries, and the bottom of ring 39 being anchored through lining vapor conduit 18 to the outer edge of neck 4, compensation for expansion upwardly of ring 39 and downwardly of ring 38 is provided for by compression vertically of bellows ring 31.

To protect the expansion joint from corrosion and particularly erosion a substantially catalyst fines-tight seal is mounted over the open end of bellows 33 of expansion joint 31. For clarity, the expansion joint sleeve 40, the clamping plate 41, the clamping bolt 42 and lock plate 43 have been omitted from FIGURE 1 but are shown in detail in FIGURES 5 and 6. Accordingly, in FIGURE 5 are shown ring 38 welded to base plate annulus 7, removable expansion joint sleeve 40 and clamping ring plate 41 welded or otherwise rigidly mounted on the surface of the inner periphery of base plate annulus 7. Clamping ring plate 41 is provided with ports receiving bolts 42. A locking plate 43 is mounted on each of bolts 42. Seal ring 40 is positioned between ring 38 and clamping ring plate 41. Bolts 42 are then drawn up and fit into holes provided in seal ring 40; holding seal ring 40 across the open end of bellows 33 of expansion joint 31 to provide a substantially catalyst fines-tight seal. When seal ring 40 is to be removed, bolt 42 is loosened and ring 40 dislodged by tapping on knock-out lugs 44.

FIGURE 4 illustrates the application of the present invention to a cylindrical reactor for hydrocarbon conversions employing a static bed of particle-form solid catalyst. The reactor comprises a shell 51, a layer of insulating material 52, a liner 53 horizontally spaced from insulating layer 52 and a neck 54. The layer of insulating material is thickened in the bottom of the reactor to provide a substantially horizontal shelf or platform 55 having canals or open conduits in the upper surface thereof for the admission of purge gas to the reaction zone. Rigidly mounted on said shelf or platform is base plate annulus 57 having an outer diameter substantially smaller (½"±) than that of the aforesaid shelf to allow for expansion and an inner diameter substantially that of vapor conduit 68 of neck 54.

Mounted on base plate 57 is a solids-vapor separator. Extending radially from catalyst dump pipe 58 is a plurality, usually 8, of stiffening ribs 59 and a plurality of rings 60 rigidly mounted in slots 61 of stiffening ribs 59 and slots 61 of auxiliary stiffening rib 62. Intermediate each pair of said stiffening ribs 59 is an auxiliary stiffening rib 62.

Movably mounted as by means of a plurality of studs 63 and held in place by nuts 64 is an annular perforated cover plate 65. The inner periphery of said annular cover plate 65 being welded to the outer periphery of catalyst dump pipe 58. Preferably, the annular perforated cover plate is provided with orifices on one inch centers and the total perforated area does not exceed about 97 percent of the total horizontal area of said annular perforated cover plate.

Wire mesh or screen 66, preferably 3 mesh size, is rigidly mounted as by spot welding on the top of annular perforated cover plate 65 and on the outer periphery of annular rings 60.

Stiffening ribs 59 preferably are rectangular having a length substantially equal to the distance between the outer periphery of catalyst dump pipe 58 and the inner periphery of annular rings 60 plus at least about half of the width of the annular rings 60. The lower central corner of each stiffening rib is removed so that angle 67 is about 150 degrees and the central end of the edge of the stiffening rib resting on base plate annulus 57 substantially coincides with the inner periphery 68 of the vapor outlet conduit. The stiffening ribs have a height substantially equal to the distance between base plate annulus 57 and the bottom of perforated cover plate 65.

Auxiliary stiffening ribs 62 extend from base plate 57 to the bottom of perforated cover plate 65. The auxiliary stiffening ribs 62 extend inwardly from the annular rings 60 as required. Said auxiliary stiffening ribs also are slotted to receive said annular rings 60. Preferably, said annular rings are rigidly mounted, as by welding, on said auxiliary stiffening ribs as well as on the stiffening ribs 59.

Catalyst dump conduit 58 extends from the bottom of the catalyst bed at least to the horizontal plane in which the outer face 69 of flange 70 of reactor neck 54 lies. Catalyst dump pipe 58 is provided with two lugs or ears or shoulders 71 through which bolts 72 having nuts 73 pass. Catalyst dump conduit 58 is provided with closure means comprising a plate 74 having ears 75 through which bolts 72 pass. Closure plate 74 is drawn into a catalyst-tight position by drawing up on nuts 73.

A plurality of studs 76, usually 8 in number, are mounted on the internal face of neck 54, spaced from the inner periphery 79 of neck 54 a distance such that the inner surface of ring 78 is substantially in line with the inner periphery of neck 54. A plate 77 is welded or otherwise rigidly mounted on each of studs 76. A ring 78 is rigidly mounted as by welding on plates 77, the whole comprising a support for the lateral surface of insulating layer 55. This insulation protecting structure can be omitted when desirable. It is to be noted that ring 78 does not extend to base plate 57 and that ring 78 is formed from metallic mesh.

Neck 54 is provided with a purge connection, an insulating layer, an internal conduit, and a single U expansion joint in the aforesaid internal conduit. The internal conduit and expansion joint, together with the layer of insulation, combine to form a purge gas conduit and purge gas chamber in fluid connection with a purge gas distribution conduit through which gas is passed to purge the space between the bottom-supported liner and the layer of insulating material on the inner surface of the reactor shell.

A horizontal annulus 80 is mounted rigidly in any suitable manner, as by welding, on the outer periphery of vapor conduit 68 a distance from the base plate 57 sufficient to accommodate expansion joint 81. Annulus 80 has an outside diameter substantially that of the inner diameter of neck 54. The inner diameter of annulus 80 is substantially that of the vapor conduit 68 of neck 54 and the internal diameter of base plate annulus 57. In other words, the width of annulus 80 is that of the insulating layer 82 and somewhat greater than the depth of bellows 83 of expansion joint 81. Annulus 80 is provided with a notch or U-shaped orifice 84.

Insulating material 82, for example, insulating concrete "gunned" in place, is mounted on the inner wall of neck 54 between annulus 80 and the outer edge of neck 54 to a depth substantially equal to the width of annulus 80. A port 85 in fluid connection with purge connection 86 and a purge conduit 87 permitting flow of purge gases from purge connection 86 to notch or U shaped orifice 84 in annulus 80 is provided in any suitable manner in the layer of insulating material 82.

A vapor conduit 68 is rigidly mounted, as by welding the upper end thereof to ring 88 and the lower end thereof to the outer edge of neck 54, on the layer 82 of insulating material.

Expansion joint 81, which is a single U or bellows ring shaped expansion joint is welded or otherwise rigidly mounted on ring 88. Ring 88 in turn is welded or otherwise rigidly suspended from base plate annulus 57 in the region of the inner periphery thereof. The lower edge of expansion joint 81 is welded or otherwise rigidly mounted on ring 89.

We claim:
1. In a contacting chamber adapted to contain a bed of particulate solid contact material superposed on a bed of graded particulate inert material and having an outlet in the bottom thereof, a neck, having a purge connection, rigidly mounted in said outlet, a vapor conduit mounted in spaced relation with the inner surfaces of said neck, an annular bottom plate having an outer diameter less than the diameter of said chamber and an inner diameter substantially the same as the diameter of said vapor conduit, said annular bottom plate being rigidly mounted horizontally in spaced relation with the bottom of said chamber and concentric with said vapor conduit, a liner rigidly mounted near the outer periphery of said annular bottom plate in spaced relation with the surfaces of said chamber above the plane of said annular bottom plate, insulating material between said annular bottom plate and said bottom of said chamber, and insulating material between said vapor conduit and the inner surface of said bottom outlet, the combination of a plurality of support plates mounted on radii of said annular bottom plate, each of said support plates having a length less than the radius of said annular bottom plate, the outer edges of said support plates being horizontally notched to receive a plurality of vertically spaced apart bands, a band mounted in each of the aforesaid notches, a perforated plate having a diameter not substantially greater than the outer diameters of said bands movably mounted on the tops of said support plates, mesh rigidly secured to said perforated plate and to the outer peripheries of said bands, the aforesaid combination providing a solids-vapor separator having a total vertical area of vapor passage at least 75 percent of the total vertical vapor-solids separation area.

2. In a contacting chamber adapted to contain a bed of particulate solid contact material superposed on a bed of graded particulate inert material and having an outlet in the bottom thereof, a neck, having a purge connection, rigidly mounted in said outlet, an annular bottom plate having an outer diameter less than the diameter of said chamber and an inner diameter less than the diameter of said outlet, said annular bottom plate being rigidly mounted horizontally in spaced relation with the bottom of said chamber, a liner rigidly mounted near the outer periphery of said annular bottom plate in spaced relation with the surfaces of said chamber above the plane of said annular plate, insulating material between said annular bottom plate and said bottom of said container, and a solids-vapor separator rigidly mounted on said annular bottom plate concentric therewith, the substantially concentric combination of a first ring anchored to the aforesaid annular bottom plate in the region of the inner periphery thereof and extending into said neck; a vapor conduit, comprising a right cylindrical upper section and a frustro-conical lower section, said lower section having a maximum outer diameter substantially the same as the inner diameter of said neck rigidly mounted at the bottom of said lower section on the inner periphery of said neck; a second ring rigidly mounted on the upper edge of said vapor conduit; a U-shaped expansion bellows ring anchored to the lower edge of said first ring and to the upper edge of said second ring; a third ring having a plurality of orifices rigidly mounted on the inner periphery of said annular bottom plate; a fourth ring movably mounted between said third ring and said expansion bellows ring, a bolt in each of the orifices of said third ring constructed and arranged to press said fourth ring against said expansion bellows ring to provide a contact material fines-tight closure for said expansion bellows; combination providing a vapor outlet having a contact material fines-tight expansion joint.

3. In a contacting chamber adapted to contain a bed of particulate solid contact material superposed on a bed of graded particulate inert material and having an outlet in the bottom thereof, a neck having a purge connection rigidly mounted in said outlet, an annular bottom plate having an outer diameter less than the diameter of said chamber and an inner diameter substantially the same as the diameter of a vapor conduit hereinafter described, said annular bottom plate being rigidly mounted horizontally in spaced apart relation with the bottom of said chamber and concentric with said outlet, a liner rigidly mounted near the outer periphery of said annular bottom plate in spaced relation with the surfaces of said chamber above the plane of said annular plate, insulating material between said annular bottom plate and said bottom of said chamber, the combination of a plurality of horizontally spaced apart support plates mounted on radii of said annular bottom plate, each of said support plates having a length less than the radius of said annular bottom plate, the outer edges of said support plates being horizontally notched to receive a plurality of spaced apart annuli, a notched annulus mounted in each of the aforesaid notches, a perforated plate having a diameter not substantially greater than the outer diameters of said notch annuli, movably mounted on the tops of said support plates, a mesh rigidly secured to said perforated plate and to the outer peripheries of said notch annuli, a first ring anchored to the aforesaid annular bottom plate in the region of the inner periphery thereof and extending into said neck; a vapor conduit, comprising a right cylindrical upper section and a frustro-conical lower section, said lower section having a maximum outer diameter substantially the same as the inner diameter of said neck, rigidly mounted at the bottom of said lower section on the inner periphery of said neck; a second ring rigidly mounted on the upper edge of said vapor conduit; a U-shaped expansion bellows ring anchored to the lower edge of said first ring and to the upper edge of said second ring; a third ring having a plurality of orifices rigidly mounted on the inner periphery of said annular bottom plate; a fourth ring movably mounted between said third ring and said expansion bellows ring; a bolt in each of the orifices of said third ring constructed and arranged to press said fourth ring against said expansion bellows ring to provide a contact material fines-tight closure for said expansion bellows, all of said rings and vapor conduit being concentric with said neck.

4. The combination described and set forth in claim 1 wherein the perforated plate is an annulus having an inner diameter substantially that of the outer diameter of a cylindrical contact material dump-pipe, wherein said contact material dump-pipe extends from substantially at least the outer face of the aforesaid neck to the upper surface of said bed of graded particulate inert material, wherein said contact material dump-pipe is rigidly mounted in the aforesaid annular perforated plate concentric with said neck and with the upper end thereof substantially in the horizontal plane of the upper surface of said bed of graded particulate inert material, said contact material dump-pipe having movable closure means at the bottom thereof, wherein each of said support plates is a polygon having two parallel horizontal sides one of which is shorter than the other, two parallel vertical sides one of which is shorter than the other, and the fifth side joins the shorter vertical side with the shorter horizontal side, and wherein the shorter vertical sides of said support plates butt the aforesaid contact material dump-pipe.

5. The combination described and set forth in claim 1, wherein the perforated plate is an annulus having an inner diameter substantially that of the outer diameter of a cylindrical contact material dump-pipe, wherein said cylindrical contact material dump-pipe extends from substantially at least the outer surface of said neck to the upper surface of said bed of graded particulate inert material, wherein said contact material dump-pipe is rigidly mounted in the aforesaid annular perforated plate concentric with said neck and with the upper end thereof substantially in the horizontal plane of the upper surface of said bed of graded particulate inert material, said contact material dump-pipe having movable closure means at the bottom thereof, wherein an auxiliary support plate horizontally notched to receive said notch annuli is mounted on said annular bottom plate between each pair of adjacent support plates, said auxiliary support plate having a height substantially the same as that of said support plate, having a width substantially less than the width of said support plates, and having the notched ends substantially in the same arc as the notched ends of the adjacent support plates, wherein each of said support plates is a polygon having two parallel horizontal sides one of which is shorter than the other, two parallel vertical sides one of which is shorter than the other, and the fifth side joins the shorter vertical side with the shorter horizontal side, and wherein the shorter vertical sides of said polygonal support plates butt the aforesaid contact material dump-pipe.

6. The combination described and set forth in claim 3 wherein the perforated plate is an annulus having an inner diameter substantially that of the outer diameter of a cylindrical contact material dump-pipe, wherein said cylindrical contact material dump-pipe extends from substantially at least the outer surface of said neck to the upper surface of said bed of graded particulate inert material, wherein said contact material dump-pipe is rigidly mounted in the aforesaid annular perforated plate concentric with said neck and with the upper end thereof substantially in the horizontal plane of the upper surface of said bed of graded particulate inert material, said contact material dump-pipe having movable closure means at the bottom thereof, wherein an auxiliary support plate horizontally notched to receive said notch annuli is mounted on said annular bottom plate between each pair of adjacent support plates, said auxiliary support plate having a height substantially the same as that of said support plate, having a width substantially less than the width of said support plates, and having the notched ends substantially in the same arc as the notched ends of the adjacent support plates, wherein each of said support plates is a polygon having two parallel horizontal sides one of which is shorter than the other, two parallel vertical sides one of which is shorter than the other, and the fifth side joins the shorter vertical side with the shorter horizontal side, and wherein the shorter vertical sides of said polygonal support plates butt the aforesaid contact material dump-pipe.

7. In the combination set forth in claim 3, channels in the upper surface of said insulating material between said annular bottom plate and said bottom of said chamber, a horizontal annulus having a U-shaped notch in the inner periphery thereof mounted on the outer periphery in the region of the top of said vapor outlet conduit, a plenum in fluid connection with the aforesaid channels and the aforesaid U-shaped notch, and insulating material having a conduit in fluid connection with the aforesaid U-shaped notch and said purge connection.

References Cited in the file of this patent
UNITED STATES PATENTS

| | | |
|---|---|---|
| 2,808,319 | Huff | Oct. 1, 1957 |
| 2,820,702 | James | Jan. 21, 1958 |
| 2,884,372 | Bergstrom | Apr. 28, 1959 |